March 31, 1942.  J. F. ZOTTER  2,277,810
BEARING SEAL
Filed Jan. 6, 1940
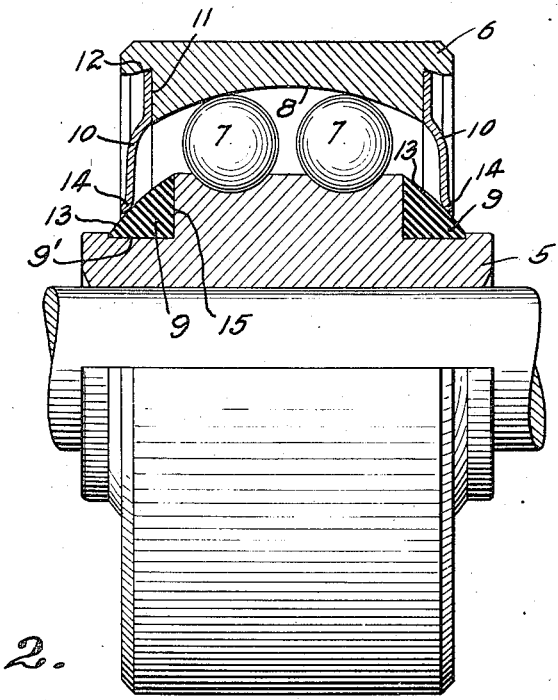
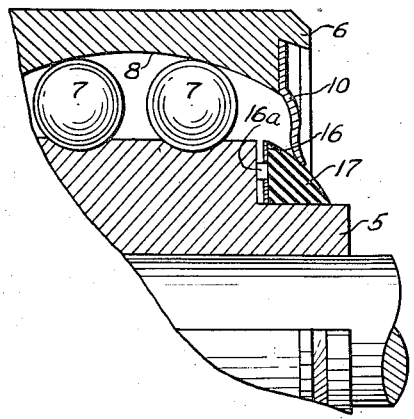
INVENTOR
JOHN F. ZOTTER
BY
ATTORNEYS.

Patented Mar. 31, 1942

2,277,810

UNITED STATES PATENT OFFICE 2,277,810

BEARING SEAL

John F. Zotter, New Britain, Conn., assignor to The Fafnir Bearing Company, New Britain, Conn., a corporation of Connecticut Application January 6, 1940, Serial No. 312,629

3 Claims. (Cl. 286—5)

My invention relates to an anti-friction bearing and more particularly to an improved form of bearing seal.

It is an object of the invention to provide a simple improved form of bearing seal relatively cheap to manufacture and highly efficient in retaining lubricant in the bearings and excluding foreign matter therefrom.

Other objects and various features of novelty and invention will be hereinafter pointed out or will become apparent to those skilled in the art.

In the drawing which shows, for illustrative purposes only, a preferred form of the invention—

Figure 1 is an edge view in quarter section of a bearing embodying the invention.

Fig. 2 is a partial edge view similar to that of Fig. 1, but illustrating another embodiment of the invention.

While the invention is not strictly limited to a bearing of the self-alining type, it is particularly advantageous when embodied in such a bearing, and the drawing shows the invention in connection with a self-alining bearing of more or less standard construction.

The bearing may include an inner ring 5, an outer ring 6, with interposed anti-friction bearing members, such as balls 7. One of the rings, in this case the outer, is provided with a spherically formed raceway 8, the center of the sphere being on the axis of the bearing, as will be understood. Thus the balls 7, being carried in standard raceway grooves on the inner ring, will move therewith during self-alinement while the balls 7 may slide or roll along the surface 8. Such bearings are now well known in the art.

My invention is particularly in the seal for securely sealing lubricant in the bearing and excluding foreign matter therefrom. The seal in its preferred form includes a sealing ring formed of oil resistant or impervious resilient material, such as artificial rubber. This real ring 9 is carried by one of the bearing rings, in this case the inner ring, as by being mounted on a rabbeted or grooved portion 9' in the outer surface of the inner ring. The other ring, in this case the outer ring, carries a complementary seal member, preferably in the form of a seal plate 10, formed of sheet metal or the like. The outer ring may have a counterbore therein, providing a seat or abutment 11 against which the outer portion of the seal plate 10 may abut, and an undercut groove 12, into which the outer edge of the seal plate 10 may be forced or swedged or otherwise held in suitable manner. Preferably the outer sealing surface 13 on the seal ring 9 is of generally spherical form and concentric with the spherical race surface 8. The inner edge of the seal plate 10 is preferably flared outwardly, as indicated at 14, so as to provide a generally rounded smooth sealing surface on the plate 10, which surface is in sealing contact with the outer surface 13 of the seal ring 9. The parts are preferably so proportioned that the contact surface 14 on the seal plate 10 deforms the surface 13 of the ring 9 to some extent, so as to form a relatively tight seal against loss of lubricant and the ingress of foreign matter. The contact area is preferably relatively slight and the contact surfaces will be sufficiently lubricated by lubricant from the bearing, so as to avoid undue friction and to permit free rotation and self-alinement of the bearing. The degree of self-alinement is preferably limited by the seal plate 10 and the inner bearing ring in that at the limit of self-alinement the inner edge of the seal plate 10 will contact with a part of the inner ring 5 in a manner as will be understood.

It will be seen that I have provided an improved form of seal which will effectively seal the bearing even against ingress of foreign matter, such as cleaning fluid forcibly sprayed onto the bearing, as when an airplane is cleaned by being hosed or sprayed down.

My improved seal is particularly, though not exclusively, adapted for bearings having relatively low rotation and particularly to a self-alining bearing in that within the limits of self-alinement the seal will be substantially equally effective.

While I prefer to employ a seal ring 9 of generally resilient rubber-like material, the seal ring 9 may be made of any suitable material, for example, metal, and be slightly shorter than the groove 9' or, in fact, simply slipped over a turned-down portion of the inner ring and there may be a resilient washer 16 of metal or other suitable material interposed between the radially extending edge of the seal ring 9 and the adjacent abutment surface 15 of the inner ring. In the form shown in Fig. 2 the resilient washer 16 is a metallic ring having flexing tongues 16ª. Thus a non-resilient annular ring 17 may be forced outwardly into sealing contact with the seal plate 10, as heretofore described.

While the invention has been described in considerable detail and a preferred form illustrated, it is to be understood that various changes may be made within the scope of the invention as defined in the appended claims.

I claim:

1. Seal means for a bearing including a pair of concentric rings one within the other and held in axially self-aligning relationship about a point on the axis of both rings, said seal means comprising an annulus of yielding resilient material secured to one of said rings and having a surface of substantially spherical form, said surface having its center of generation substantially at the point aforesaid on the axis of both said rings, and a seal plate secured at one edge to the other of said rings and extending across the space between said rings and at its other edge into stressing sealing contact with said substantially spherical surface on said annulus of yielding resilient material.

2. Seal means for a bearing including a pair of concentric rings one within the other and held in axially self-aligning relationship about a point on the axis of both rings, said seal means comprising an annulus of yielding resilient material secured to the inner of said rings and having a convex surface of substantially spherical form, said surface having its center of generation substantially at the point aforesaid on the axis of both said rings, and a seal plate secured at its outer edge to the outer of said rings and extending across the space between said rings and at its inner edge into stressing sealing contact with said substantially spherical surface on said annulus of yielding resilient material.

3. Seal means for a bearing including a pair of concentric rings one within the other and held in axially self-aligning relationship about a point on the axis of both rings, said seal means comprising a seal annulus movably mounted on one of said rings and having a surface of substantially spherical form, said surface having its center of generation substantially at the point aforesaid on the axis of both said rings, and a seal plate secured to the other of said rings and extending across the space between said rings and at its other edge into sealing contact with said substantially spherical surface, and spring means between said seal annulus and said ring carrying said annulus for constantly urging the latter into sealing contact with said seal plate.

JOHN F. ZOTTER.